Aug. 2, 1938.  M. P. WHITNEY  2,125,477
HOSE COUPLING
Filed May 4, 1937

Witness:
Burr W. Jones

INVENTOR.
BY Maurice P. Whitney
Clinton S. Janes
ATTORNEY.

Patented Aug. 2, 1938

2,125,477

UNITED STATES PATENT OFFICE 2,125,477

HOSE COUPLING

Maurice P. Whitney, Elmira, N. Y., assignor to Eclipse Machine Company, Elmira, N. Y., a corporation of New York Application May 4, 1937, Serial No. 140,624

5 Claims. (Cl. 285—174)

The present invention relates to hose couplings and more particularly to a quick detachable coupling for releasably connecting hose lines transmitting fluids under vacuum or moderate pressures.

Various types of quick detachable hose couplings have been developed and found commercial acceptance, but such couplings have in general been more or less specialized in character in accordance with the type of installation in which they are employed. In particular there is a lack of commercial couplings of this type which are interchangeably adaptable for use with conduits for either vacuum or moderate pressure.

It is an object of the present invention to provide a novel quick detachable hose coupling which is simple and economical in construction and efficient and reliable in operation.

It is another object to provide such a device which is readily operable by very simple manipulation, requiring no twisting or rotation of any kind.

Another object is to provide such a device which is equally well adapted for use in vacuum lines and in lines carrying moderate positive pressures.

Further objects and advantages will be apparent from the following description taken in connection with the accompanying drawing in which.

Figure 1:
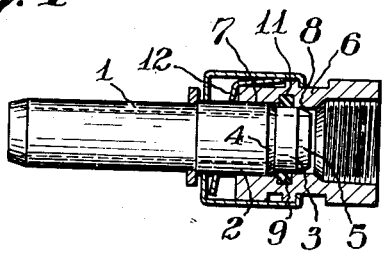
Fig. 1 is a side elevation partly in section of a coupling embodying a preferred form of the invention.
Figure 2:
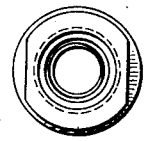
Fig. 2 is an end view of the same.

Referring first to Fig. 1 of the drawing, there is illustrated a spud or nipple 1 having a cylindrical surface 2 adapted to enter a socket member, and a second cylindrical surface 3 of smaller diameter adjacent its end, the step between the two surfaces being defined by a beveled shoulder 4. The end of the nipple is preferably beveled as indicated at 5 to facilitate entry into the socket.

A socket member 6 is provided with an interior cylindrical surface 7 adapted to loosely fit the portion 2 of the nipple and a second cylindrical surface 8 adapted to receive the portion 3 of the nipple. Packing means illustrated in the form of a ring 9 of rubber or other suitable material is mounted in a groove 11 in the socket in position to bear on the portion 3 of the nipple when the coupling is assembled.

Figure 4:
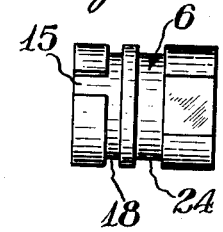
Fig. 4 is a side elevation of the socket member.
Figure 5:
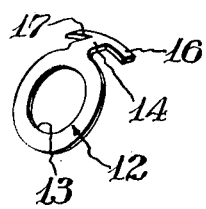
Fig. 5 is a detail in perspective of the automatic locking device.

Releasable locking means for holding the coupling in assembled relation is provided in the form of a spring clip 12 (Fig. 5) having a circular opening 13 adapted to embrace the portion 2 of the nipple and having an extension 14 adapted to seat in a longitudinal groove 15 (Fig. 4) in the periphery of the socket and provided with laterally extending portions 16 and 17 adapted to seat in a circumferential groove 18 in the socket so as to prevent longitudinal withdrawal of the locking clip from the socket.

A thimble 19 is arranged to bear loosely on the periphery of the socket, having a flange 21 at its outer end provided with an opening 22 to receive the nipple, and a flange 23 at its inner end arranged to project into a circumferential groove 24 in the periphery of the socket, the width of the groove 24 being sufficiently greater than the thickness of the flange 23 to permit limited longitudinal movement of the thimble on the socket. The thimble thus acts as a retainer to prevent dislodgment of the locking clip 12 from its anchored position on the socket, and longitudinal movement of the thimble to the right causes the flange 22 thereof to engage the portion of the locking clip which embraces the nipple and straighten it up into a position approximately at right angles to the axis of the coupling. The locking clip 12 by reason of its elasticity is biased toward an inclined position wherein its opening 13 engages and grips the portion 3 of the nipple with a clamping action.

Figure 3:
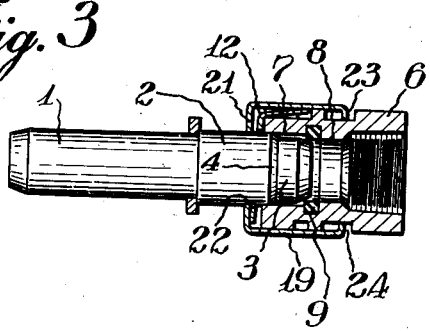
Fig. 3 is a view similar to Fig. 1 showing the parts in unlocked and partially disassembled relation.

In the operation of the device, introduction of the nipple into the socket as illustrated in Fig. 3 causes the locking clip 12 to straighten up sufficiently to slide on the portion 2 of the nipple, whereupon the cylindrical portions of the nipple enter the corresponding portions of the socket, with the packing 11 bearing snugly on the portion 3 of the nipple. Withdrawal of the nipple from the socket is then prevented by the clamping engagement of the locking member 12 thereon, which engagement is tightened by such efforts.

When it is desired to release the coupling, it is merely necessary to apply longitudinal pressure to the thimble 19, preferably by pressure on the outer flange 21 thereof. The flange 21 thereupon engages the locking portion of the clip 12, causing it to straighten up and release the nipple, whereupon the latter may be readily withdrawn.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In a hose coupling, a socket member, a nipple member adapted to fit loosely therein, means for packing the joint therebetween, a locking element anchored to one coupling member having a portion loosely fitting the other member and tiltable to grip the same, and a manually operable thimble surrounding the socket and slidable thereon for straightening up the gripping portion of the locking element to release the coupling.

2. In a hose coupling, a socket member, a nipple member adapted to fit loosely therein, means for packing the joint therebetween, a locking element anchored to the socket member comprising a portion having an opening embracing the nipple member and biased to tilt and grip the same, and a manually operable thimble surrounding the socket and slidable thereon for straightening up the gripping portion of the locking element to release the nipple member.

3. In a hose coupling, a socket, a nipple fitting loosely in said socket, a locking clip anchored to the socket and gripping the nipple, and a thimble surrounding the socket, retaining the locking clip in its anchorage and slidable on the socket to engage and release the gripping portion of the clip.

4. In a hose coupling, a socket, a nipple having a cylindrical portion fitting loosely in said socket, a locking clip anchored to the socket and having a portion embracing the cylindrical portion of the nipple and tiltable to grip the same, and a thimble surrounding the socket, retaining the locking clip in its anchorage and manually slidable on the socket to straighten up and release the clip from the nipple.

5. In a hose coupling, a socket having internal cylindrical surfaces of stepped diameters, a nipple having cylindrical surfaces loosely fitting the interior of the socket, a ring of packing material seated in the socket adjacent the junction of two stepped portions thereof and snugly fitting the nipple, a locking spring clip anchored to the exterior of the socket, embracing the protruding portion of the nipple, and biased to incline and grip the nipple, and a thimble loosely mounted on the socket enclosing the locking clip and longitudinally movable to engage and release the clip.

MAURICE P. WHITNEY.